United States Patent
Des Garennes et al.

(10) Patent No.: US 10,119,627 B2
(45) Date of Patent: Nov. 6, 2018

(54) POPPET VALVE

(71) Applicant: Dryject Inc. Acquisition Corp., Hatboro, PA (US)

(72) Inventors: Chris Des Garennes, Elkton, MD (US); Peter Van Drumpt, Wilmington, NC (US); John Paddock, Hainesport, NJ (US)

(73) Assignee: DRYJECT INC. ACQUISITION CORP., Hatboro, PA (US)

( * ) Notice: Subject to any disclaimer, the term of this patent is extended or adjusted under 35 U.S.C. 154(b) by 62 days.

(21) Appl. No.: 15/125,020

(22) PCT Filed: Aug. 12, 2014

(86) PCT No.: PCT/US2014/050632
§ 371 (c)(1),
(2) Date: Sep. 9, 2016

(87) PCT Pub. No.: WO2015/137993
PCT Pub. Date: Sep. 17, 2015

(65) Prior Publication Data
US 2017/0023148 A1    Jan. 26, 2017

Related U.S. Application Data

(60) Provisional application No. 61/951,232, filed on Mar. 11, 2014.

(51) Int. Cl.
*F16K 1/34*     (2006.01)
*F16K 31/06*    (2006.01)
(Continued)

(52) U.S. Cl.
CPC ........ *F16K 31/0675* (2013.01); *F16K 11/044* (2013.01); *F16K 31/0627* (2013.01); *F16K 31/408* (2013.01)

(58) Field of Classification Search
CPC .......... F16K 1/00; F16K 1/34; F16K 31/0655; F16K 31/406; F16K 31/408
(Continued)

(56) References Cited

U.S. PATENT DOCUMENTS 2,673,706 A * 3/1954 Matteson ............... F16K 47/023
                                                        251/14
2,705,608 A * 4/1955 Phillips ................. F16K 31/404
                                                      251/30.03

(Continued)

FOREIGN PATENT DOCUMENTS

EP            0010351 A1    4/1980

*Primary Examiner* — Seth W Mackay-Smith
(74) *Attorney, Agent, or Firm* — Volpe and Koenig, P.C.

(57) ABSTRACT

A poppet valve for controlling water flow is provided, the poppet valve includes a housing, a movable armature arranged within the housing, a pilot pin having first and second ends, and a return element associated with the pilot pin. The first end of the pilot pin is associated with and driven by the armature, and a poppet is arranged around the second end of the pilot pin. A cage is arranged around the poppet, the cage having a transverse opening adapted for water to flow therethrough. The armature is selectively actuated to drive the pilot pin in a first direction towards a closed position, in which the transverse opening of the cage is blocked by the poppet. The return element drives the pilot pin in a second direction towards an open position, in which the transverse opening of the cage is unblocked by the poppet.

19 Claims, 8 Drawing Sheets

(51) Int. Cl.
*F16K 31/40* (2006.01)
*F16K 11/044* (2006.01)

(58) Field of Classification Search
USPC .................................................. 251/129.15
See application file for complete search history.

(56) References Cited

U.S. PATENT DOCUMENTS

| | | | |
|---|---|---|---|
| 4,526,340 A | 7/1985 | Kolchinsky et al. | |
| 4,540,154 A * | 9/1985 | Kolchinsky | F16K 31/408 137/315.03 |
| 4,666,125 A * | 5/1987 | Marts | F16K 31/0655 251/129.15 |
| 4,848,721 A | 7/1989 | Chudakov | |
| 5,002,253 A * | 3/1991 | Kolchinsky | F16K 31/408 251/129.15 |
| 5,222,521 A | 6/1993 | Kihlberg | |
| 5,271,599 A | 12/1993 | Kolchinsky et al. | |
| 5,769,965 A * | 6/1998 | Liedtke | C21D 1/74 148/121 |
| 6,149,124 A * | 11/2000 | Yang | F16K 31/408 251/30.03 |
| 6,328,275 B1 * | 12/2001 | Yang | F16K 31/406 137/487.5 |
| 6,390,441 B2 * | 5/2002 | Koyama | F16K 31/408 251/30.03 |
| 7,921,880 B2 | 4/2011 | Jackson et al. | |
| 2002/0003221 A1 | 1/2002 | Koyama et al. | |
| 2007/0017524 A1 * | 1/2007 | Wilson, Jr. | G05D 16/103 128/205.24 |
| 2010/0294962 A1 * | 11/2010 | Bill | F16K 31/408 251/30.01 |
| 2012/0299673 A1 * | 11/2012 | Mehta | B21K 1/24 335/278 |
| 2016/0169406 A1 * | 6/2016 | Leadley | F16K 31/408 251/30.01 |

* cited by examiner

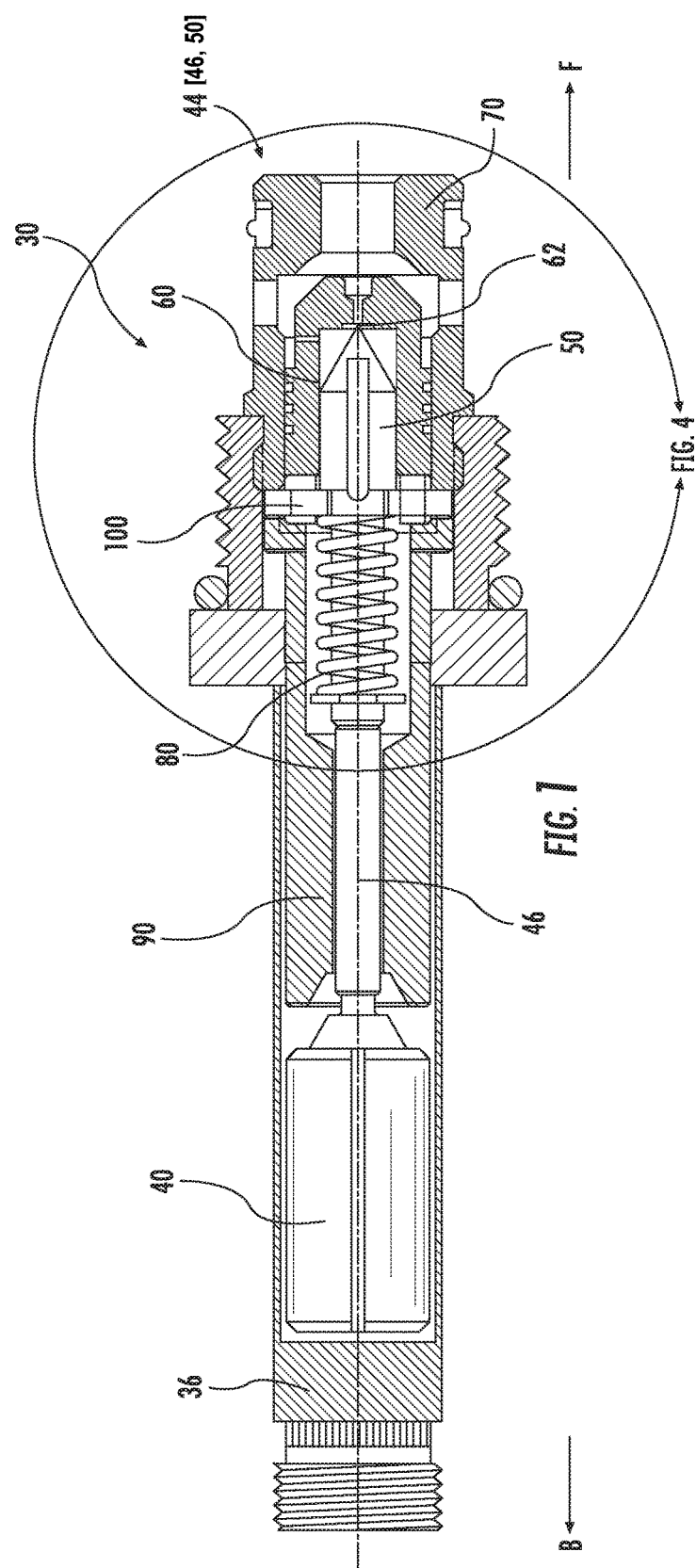

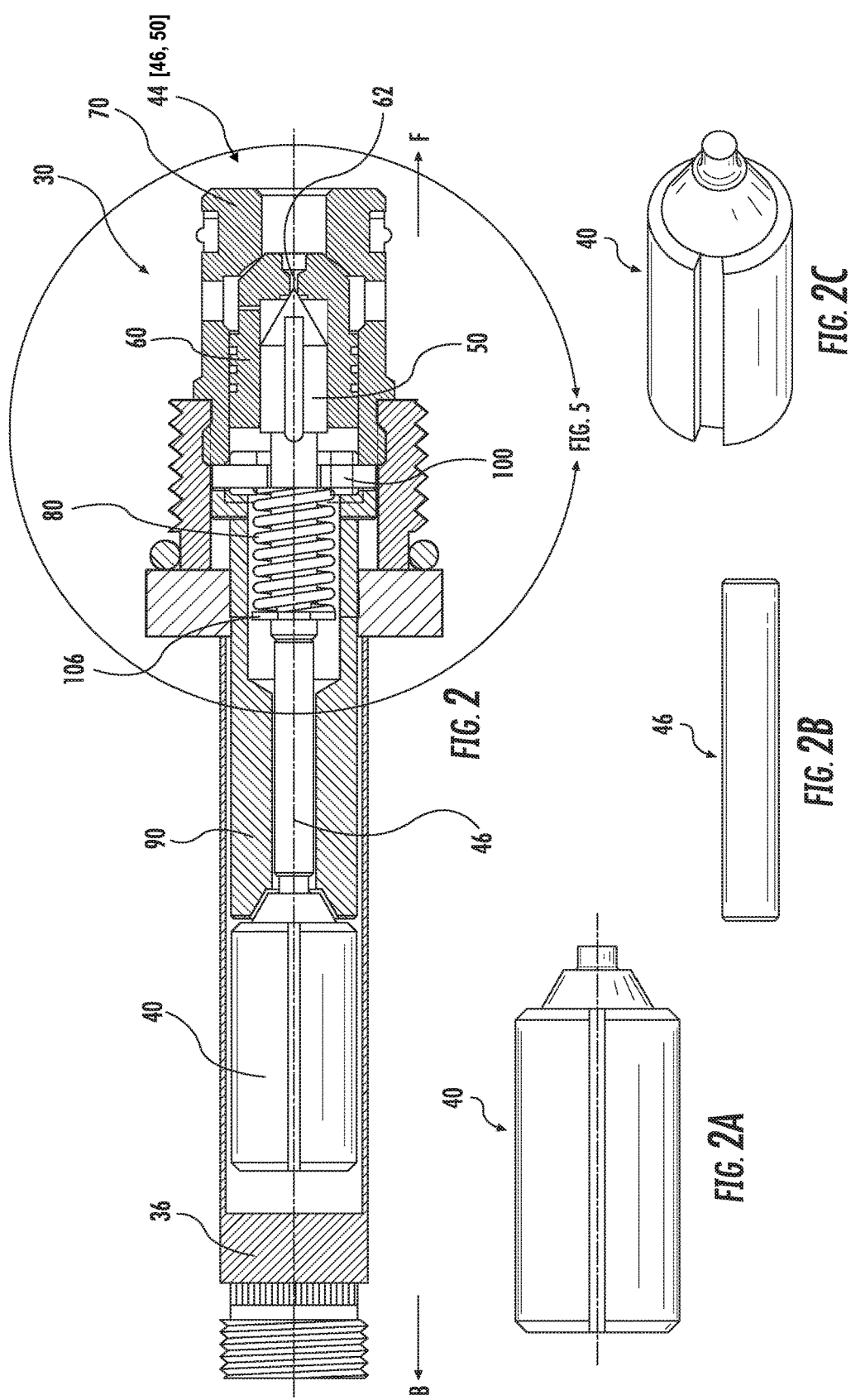

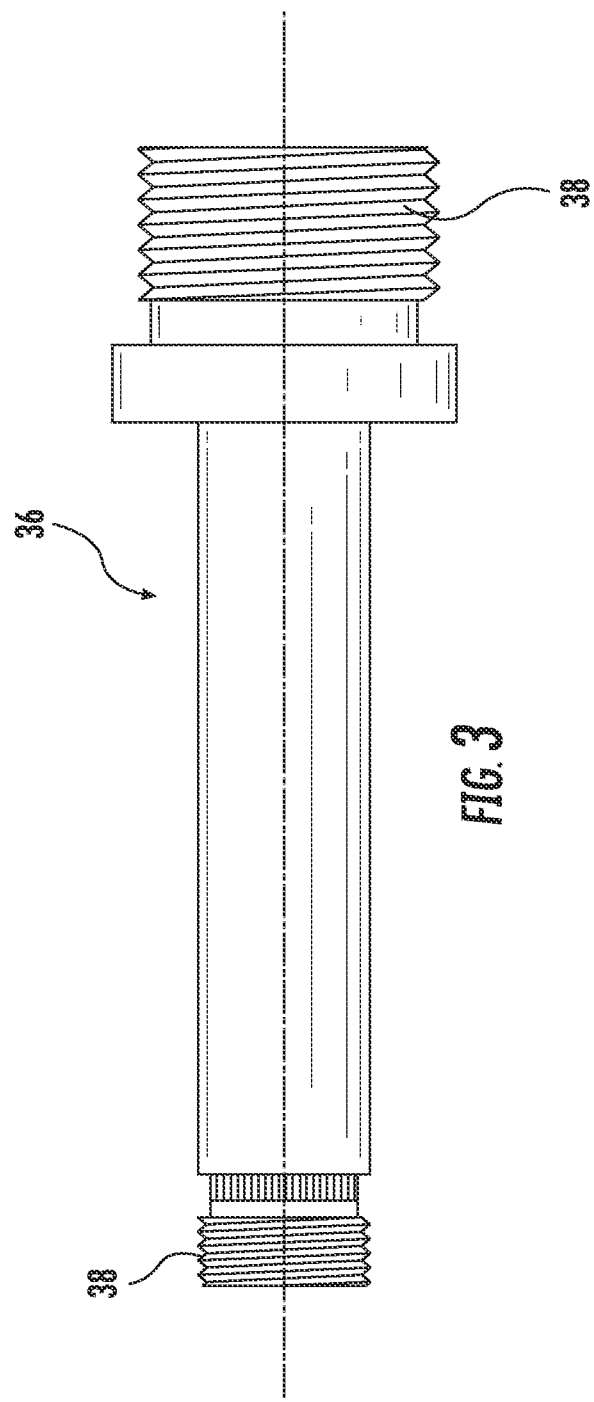

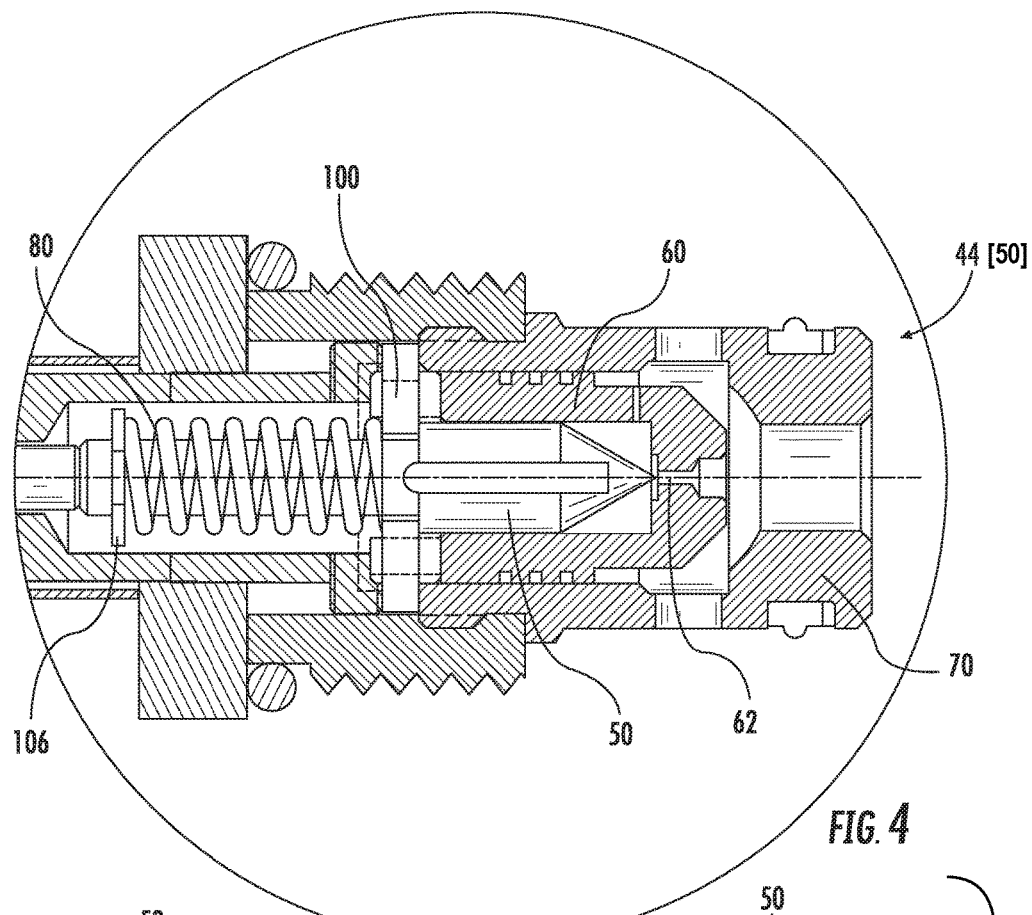
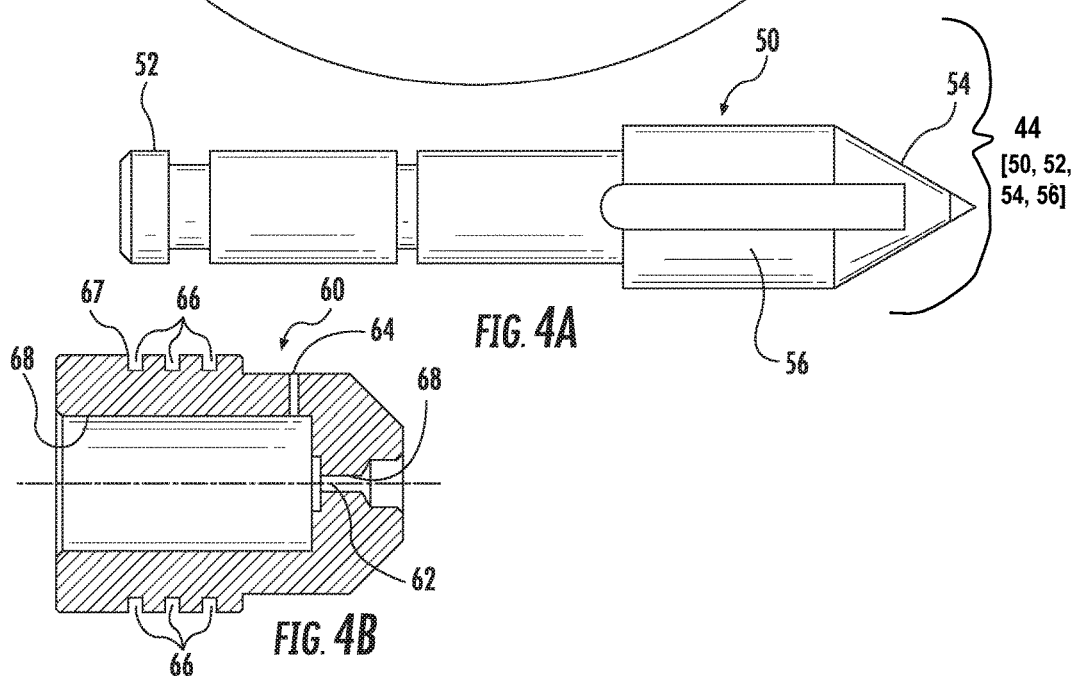

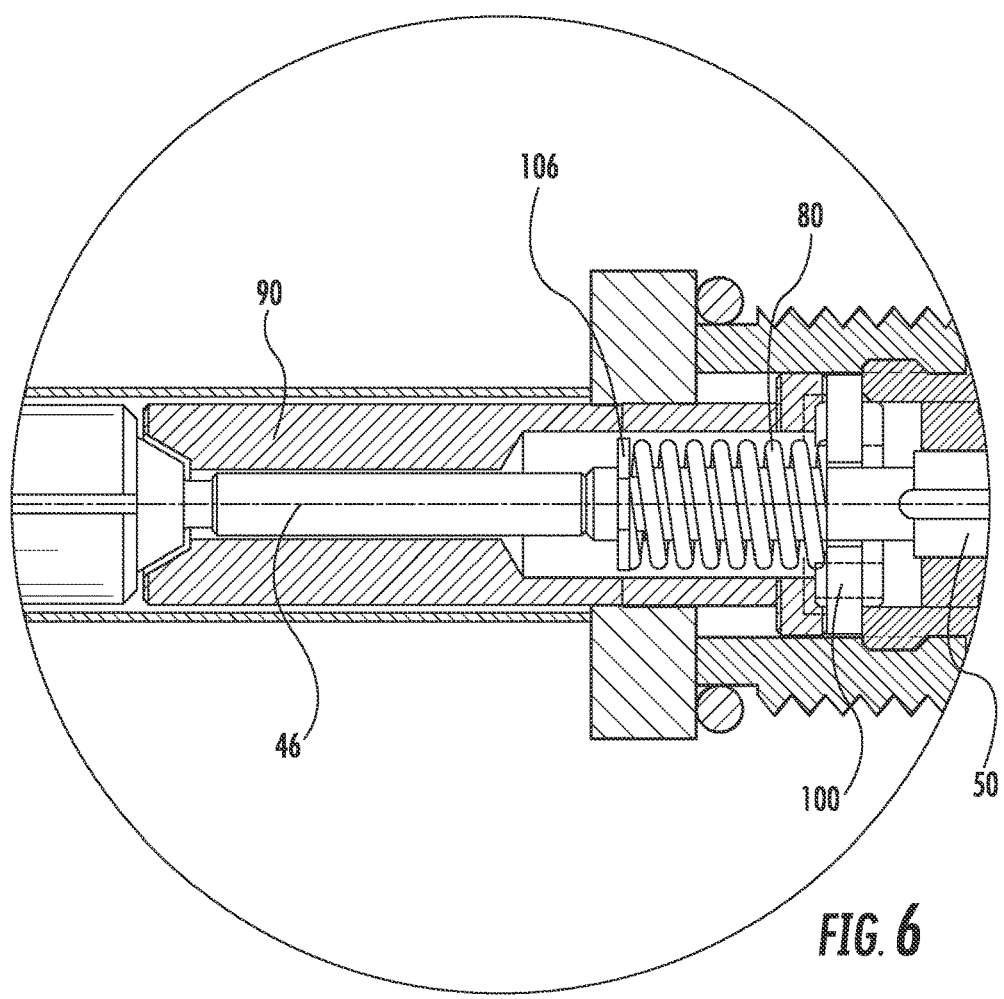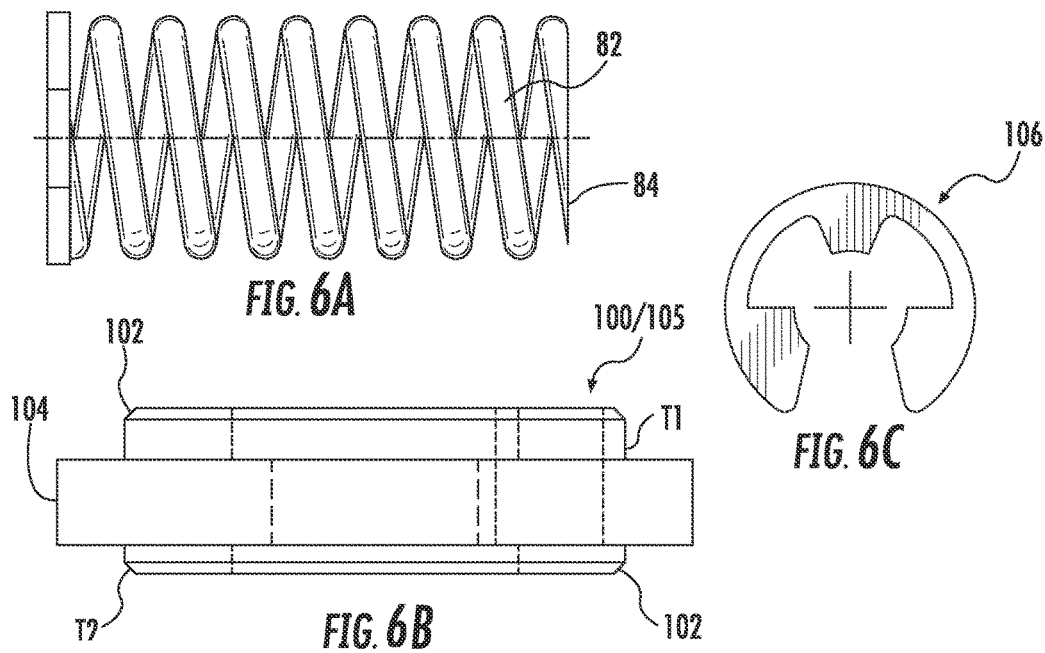

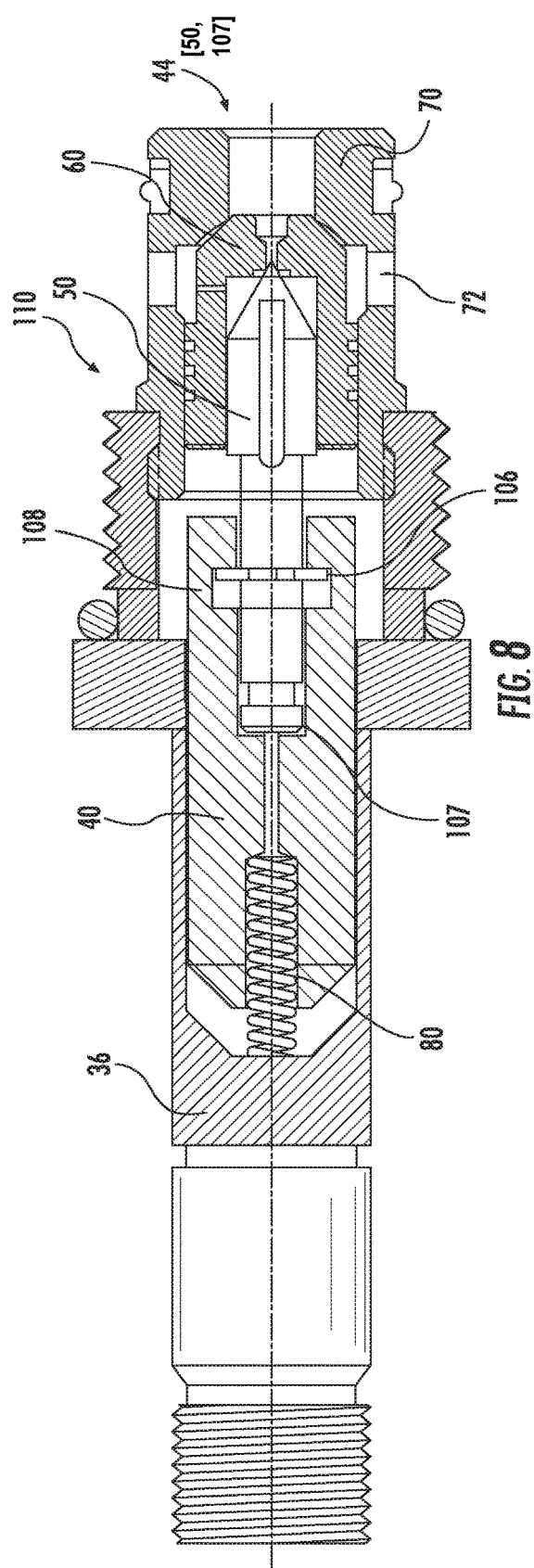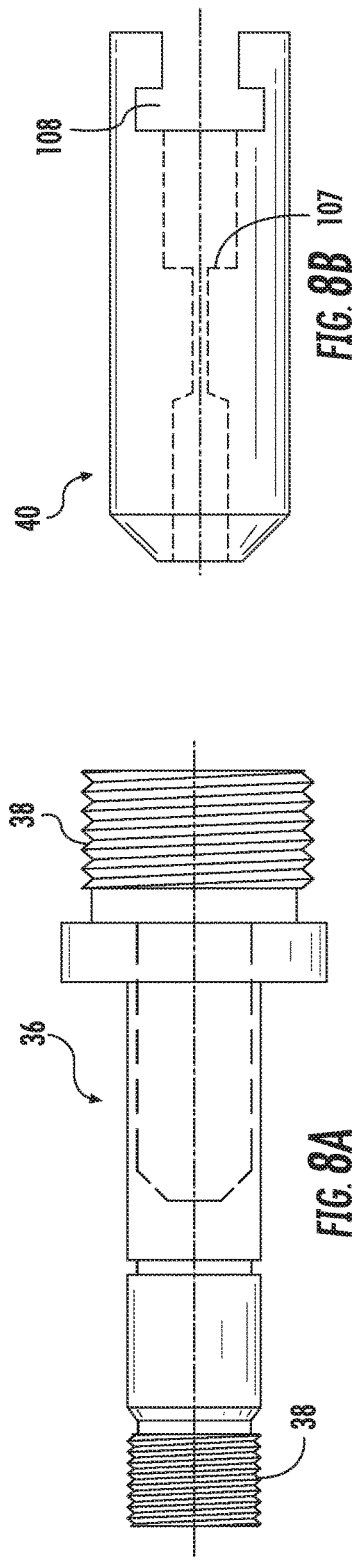

POPPET VALVE

CROSS REFERENCE TO RELATED APPLICATION

This application claims the benefit of U.S. Provisional Application Ser. No. 61/951,232 filed Mar. 11, 2014, the contents of which are hereby incorporated by reference herein.

FIELD OF INVENTION

This application is generally related to valves and more particularly related to a poppet valve used to control water flow.

BACKGROUND

Poppet valves are used in a variety of applications, generally to control the flow of a gas or liquid, and can be configured to be in a closed or open position during operation. In one particular application, poppet valves are utilized in machines for turf and soil maintenance in the landscaping and golfing industries. These turf and soil maintenance machines are used to aerate the soil and provide soil additives, such as amendments, fertilizers, and insecticides. In these machines, poppet valves are used to regulate injection of a high pressure air or liquid into the soil, which forms aeration holes and/or introduces additives. The poppet valve can be arranged in a manifold and driven by a solenoid. Examples of such machines are described in detail in U.S. Pat. No. 7,581,684 for "Device for Placing Material on or Beneath the Soil Surface and Method for Doing the Same" and U.S. Pat. No. 5,605,105 for "Method and Apparatus for Placing Dry or Liquid Materials into the Soil Subsurface Without Tillage Tools."

The poppet valves used in known turf and soil maintenance machines are generally hydraulic oil type poppet valves, which are well suited to controlling the flow of oil, but not in applications where high pressure water jets are used. Specifically, the tight tolerances necessary for operation are lubricated hydraulic oil. Known oil type poppet valves are unable to operate at the rapid cycling times and specific flow rates required for blasts of high pressure water, are susceptible to corrosion from the water, and experience leakage because of insufficiently tight tolerances. Therefore, a need exists for a poppet valve that is specifically designed to regulate the flow of high pressure water, can be used in a turf and soil maintenance machine, and alleviates the problems associated with oil type poppet valves.

SUMMARY

A poppet valve for controlling water flow is disclosed. The poppet valve includes a housing, a movable armature arranged within the housing, a pilot pin having first and second ends, and a return element associated with the pilot pin. The first end of the pilot pin is associated with and driven by a rod. The rod is acted upon by the movable armature. A poppet is arranged around the second end of the pilot pin. A cage is arranged around the poppet, the cage having a transverse opening adapted for water to flow therethrough. The armature is selectively actuated to drive the pilot pin in a first direction towards a closed position, in which the transverse opening of the cage is blocked by the poppet. The return element drives the pilot pin in a second direction towards an open position, in which the transverse opening of the cage is unblocked by the poppet.

Another poppet valve for controlling water flow is disclosed, the poppet valve having a housing, an armature configured to be actuated by a solenoid and arranged within the housing, and a transmission element driven by the armature. A poppet is associated with the transmission element. A cage is arranged around the poppet, the cage having a transverse opening adapted for water to flow therethrough. The transmission element drives the poppet between a closed position, in which the transverse opening of the cage is blocked by the poppet, and an open position, in which the transverse opening of the cage is unblocked by the poppet.

A method of adjusting a flow rate of a poppet valve for controlling flow is also disclosed. The method includes the steps of providing a poppet valve having a housing, a movable armature arranged within the housing, a pilot pin and a poppet driven by the armature, a return element associated with the pilot pin, a cage arranged around the poppet, and a reversible washer having two different axial thicknesses that are on opposing sides of the washer. The washer is arranged between the guide member and the axial end of the cage. The first axial thickness of the first side of the reversible washer is selected to correspond to a first flow rate. The method further includes reversing the reversible washer so that the opposing side of the reversible washer faces the poppet. The opposing side of the washer has a second axial thickness that is different from the first axial thickness and is selected to correspond to a second flow rate.

For sake of brevity, this summary does not list all aspects of the present invention, which is described in further detailed below.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangements shown.

FIG. 1 is a cross-sectional view of an embodiment of a normally-open poppet valve.

FIG. 2 is a cross-sectional view of an embodiment of the normally-open poppet valve shown in FIG. 1 configured to be in a closed position.

FIG. 2A is a side elevational view of the armature of the poppet valve shown in FIGS. 1 and 2.

FIG. 2B is a side elevational view of a rod of the poppet valve shown in FIGS. 1 and 2.

FIG. 2C is a perspective view of the armature of the poppet valve shown in FIGS. 1, 2, and 2A.

FIG. 3 is a side elevational view of the housing of the poppet valve shown in FIGS. 1 and 2.

FIG. 4 is a detailed view of the pilot pin of the poppet valve of FIGS. 1 and 2 being moved from the closed position to an open position.

FIG. 4A is a side elevational view of the pilot pin of the poppet valve shown in FIGS. 1 and 2.

FIG. 4B is a cross-sectional view of the poppet of the poppet valve shown in FIGS. 1 and 2.

FIG. 6 is a detailed view of the armature of the poppet valve of FIGS. 1 and 2 pushing the pilot pin of the poppet valve into the closed position.

FIG. 6A is a side elevational view of the return element of the poppet valve shown in FIGS. 1, 2, and 8.

FIG. 6B is a side elevational view of a reversible washer of the poppet valve shown in FIGS. 1, 2, and 8.

FIG. 6C is a front elevational view of an E-clip of the poppet valve shown in FIGS. 1, 2 and 8.

FIG. 8 is a cross-sectional view of an embodiment of a normally-closed poppet valve.

FIG. 8A is a side elevational view of the housing of the poppet valve shown in FIG. 8

FIG. 8B is a side elevational view of the armature of the poppet valve shown in FIGS. 8.

DETAILED DESCRIPTION OF THE PREFERRED EMBODIMENTS

Figure 5:
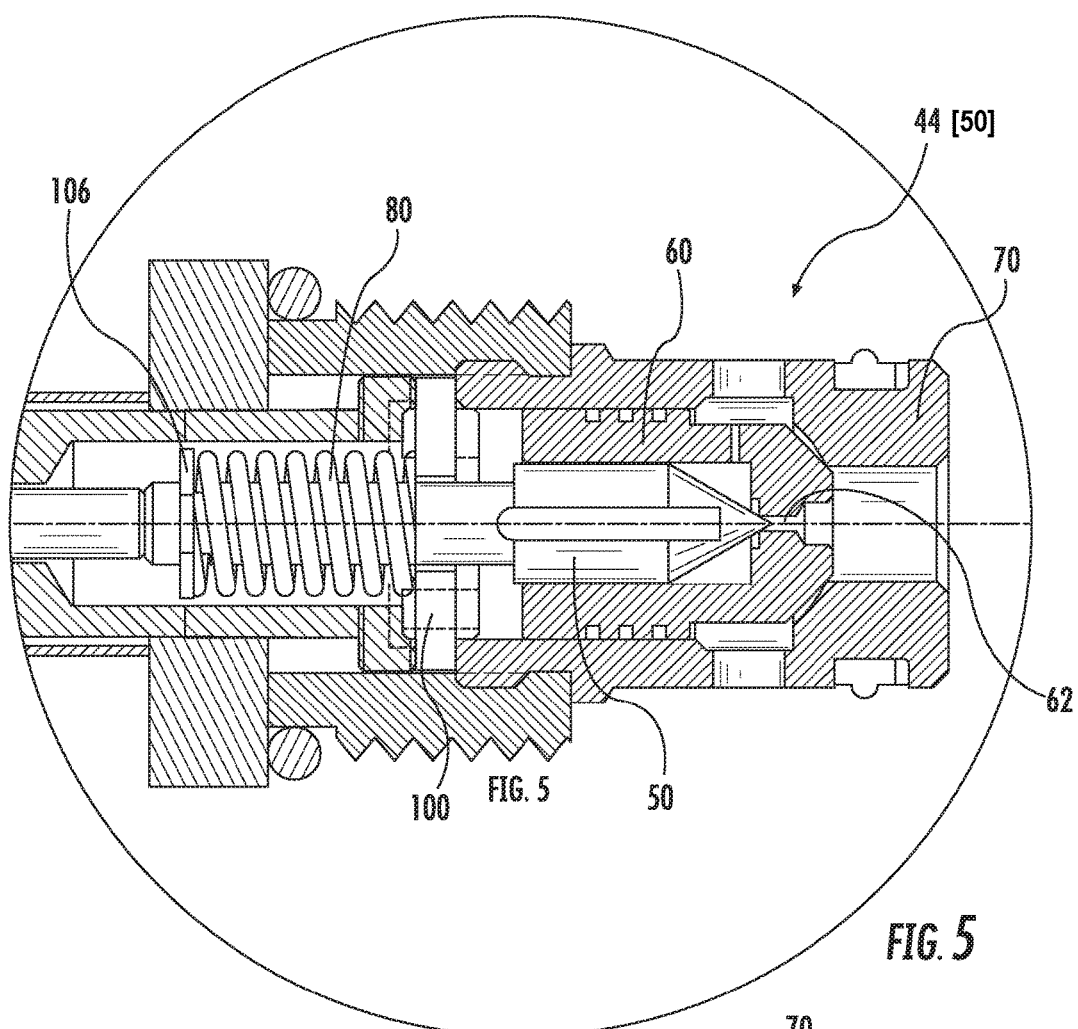
FIG. 5 is a detailed view of the pilot pin of the poppet valve of FIGS. 1 and 2 being moved from the open position to the closed position.

Certain terminology is used in the following description for convenience only and is not limiting. The words "front," "back," "forward," "backwards," "inner," and "outer" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

FIG. 1 shows an embodiment of the normally-open poppet valve 30 configured to be in an open position during operation. FIG. 2 shows the normally-open poppet valve 30 configured to be in a closed position during operation. The normally-open poppet valve 30 includes an outer housing 36, a movable armature 40 arranged within the housing 36, and a transmission element 44. The transmission element 44 is driven by the armature 40 and a rod 46 that are associated with a poppet 60. As shown in FIG. 3, the housing 36 can include an outer threading 38 at each axial end so that the normally-open poppet valve 30 can be easily connected to a larger assembly, such as within a solenoid or the manifold of a soil maintenance machine. As shown in FIGS. 4-4B, the transmission element 44 can include, for example and without limitation, a pilot pin 50 having a first end 52 and a second end 54, the first end 52 being associated with and driven by the armature 40 and the second end 54 being associated with the poppet 60. As shown in FIG. 1, the transmission element 44 can further include the rod 46 connected between the armature 40 and the first end 52 of the pilot pin 50.

In an alternative embodiment, the rod 46 can be formed integrally with the pilot pin 50 to form a pilot pin 50 of extended length.

As shown in FIG. 4A, the pilot pin 50 can include a head portion 56 d at the second end 54 thereof. The end of the head portion 56 may be cone shaped and may come to a point, which can be formed with a grind gaging diameter of approximately 0.04 inches to ensure high precision. The head portion 56 of the pilot pin 50 can be arranged within the poppet 60 and aligned with an opening 62 formed in an axial end of the poppet 60, as shown in FIGS. 4 and 4B.

As shown in FIG. 2, when the normally-open poppet valve 30 is configured in the closed position, the head portion 56 of the pilot pin 50 blocks the opening 62 s formed at the axial end of the poppet 60. To unblock the opening 62 and open the normally-open poppet valve 30, the electrical current is removed from an energized solenoid coil fitted over a narrow part of the housing of the poppet valve 36 in FIG. 3 to de-energize an Armature 40 allowing a return element 80 to return to its rest position. Return element 80 moves the head portion 56 of the pilot pin 50 in a backwards direction B and disengages the pilot pin 50 from the opening 62 so that water is drained from the outer housing 36 and the poppet 60 is then moved into the open position by water pressure.

Figure 5A:
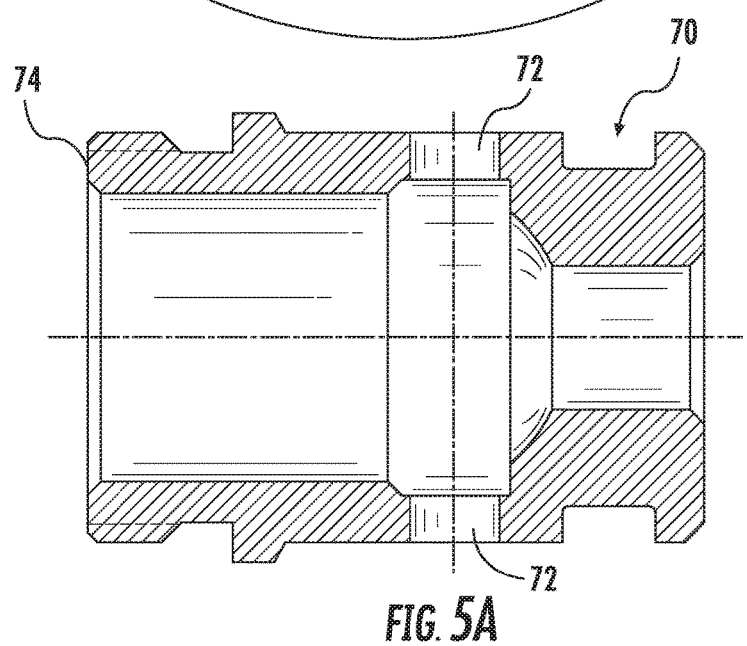
FIG. 5A is a cross-sectional view of the cage of the poppet valve shown in FIGS. 1 and 2.

As shown in FIGS. 5 and 5A, a cage 70 is arranged around the poppet 60, the cage 70 having a transverse opening 72 adapted for water to flow therethrough. The cage 70 can include a plurality of transverse openings 72 to increase water flow. The cage 70 is removably connected to an axial end of the outer housing 36, as shown in FIGS. 1, 2 and 5. The return element 80 can be associated with the pilot pin 50 to bias the pilot pin 50 and the poppet 60 towards a desired direction.

In one embodiment, shown in FIGS. 6 and 6A, the return element 80 can be a compression spring 82 of a specific specification arranged around the pilot pin 50 of the normally-open poppet valve 30, shown in FIGS. 1 and 2. The compression spring 82 is captured by an e-clip on the pilot pin 50 of the normally-open poppet valve 30 and has compression strength of approximately 37.5 lb./in. When the normally-open poppet valve 30 is in the closed position, the strength of the compression spring 82 must be sufficient to overcome 4,000 lbs. of pressure so that the pilot pin 50 can be moved in the backwards direction B and out of engagement with the poppet 60 so that water can be drained from the outer housing 36.

In another embodiment, shown in FIG. 8, the return element 80 can be a compression spring 82, shown in FIG. 6A, of a specific specification arranged in a cavity of the armature 40 of the normally-closed poppet valve 110. In the closed position, the compression spring 82 has compression strength of approximately 18.4 lb./in and is compressed between an inner shoulder of the armature 40 and an interior wall of the outer housing 36, as shown in FIGS. 8-8B. When the normally-closed poppet valve 110 is in the closed position, the strength of the compression spring 82 must be sufficient to allow the armature 40 FIG. 8 to compress it when electrical current is applied to the solenoid coil, energizing the armature 40 and causing it to move in the backwards direction B.

One of ordinary skill in the art will appreciate that other suitable return elements 80 of similar compression strength can be utilized to apply a return force to the pilot pin 50 of the normally-open poppet valve 30 or normally-closed poppet valve 110.

Figure 7:
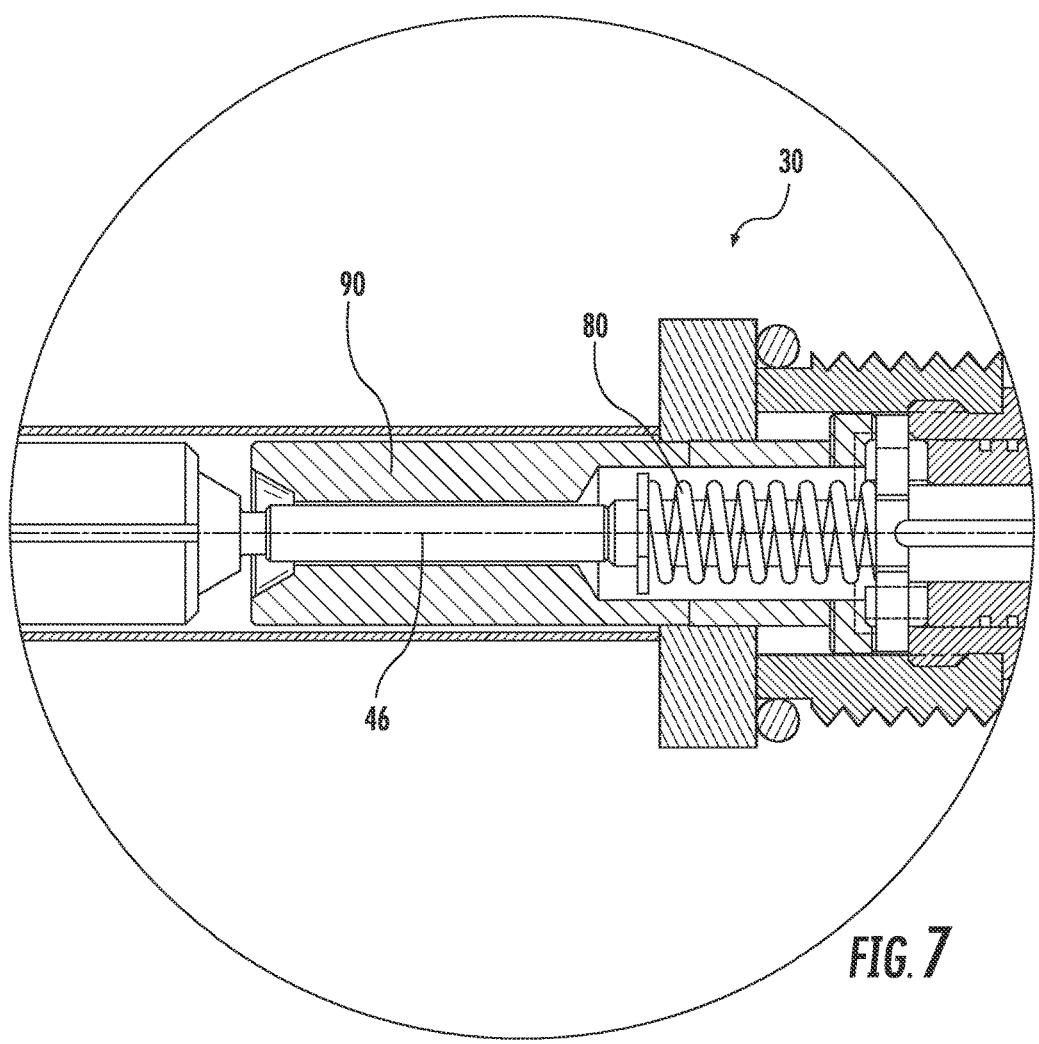
FIG. 7 is a detailed view of the armature of the poppet valve shown in FIGS. 1 and 2 in the rest position.
Figure 7A:
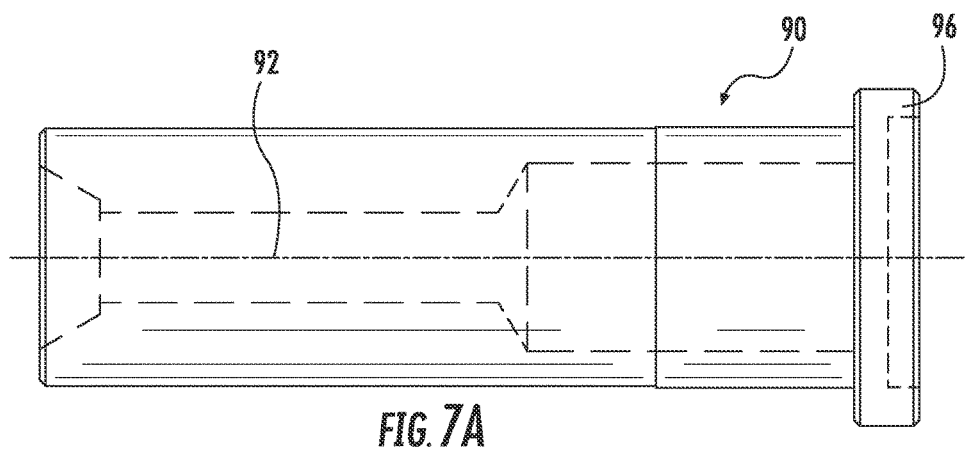
FIG. 7A is a side elevational view of the guide member of the poppet valve shown in FIGS. 1 and 2.

As shown in FIGS. 4 and 5, and noted above, the e-clip 106 retains the compression spring 82 and a washer 100 on the pilot pin 50. The e-clip 106 is positioned at the end portion 52 of the pilot pin 50. A guide member 90 can be arranged around the rod 46, pilot pin 50, and spring 82 to keep these components in alignment. The guide member 90, shown in FIGS. 1, 2, and 7A, can be formed as a substantially cylindrical tube having a cavity or bore 92 shaped to receive the rod 46, the washer 100, and at least a portion of the pilot pin 50. The washer 100 can be arranged at the head portion 56 of the pilot pin 50, providing a surface for the spring 82 to abut against. As shown in FIGS. 6 and 6B, when the normally-open poppet valve 30 is assembled, a radially inner portion 102 of the washer 100 is sandwiched between an axial end 74 of the cage 70 and a front end 84 of the spring 82, while a radially outer portion 104 of the washer 100 is sandwiched between an axial end 74 of the cage 70 and a front end surface 96 of the guide member 90. A shoulder configured to receive and support the radially inner portion 102 of the washer 100 is provided in the front end surface 96 of the guide member 90. As discussed in detail below, the thickness of the washer 100 selected to achieve a desired flow rate of the normally-open poppet valve 30. As shown in FIGS. 2-2B, when the normally-open poppet valve 30 is in the closed position, the spring 82 is compressed between the e-clip 106 and the washer 100. To open the normally-open poppet valve 30, the electrical current is removed from the energized solenoid coil fitted over a narrow part of the housing of the poppet valve 36 in FIG. 3 and the Armature 40 is de-energized so that the poppet 60 is in the rest position. When the return element 80 is de-energized and the poppet 60 is in the rest position, the magnetic attraction between the guide member 90 and the armature 40 is removed and the armature 40 is driven in a backwards direction B away from the poppet 60 by the spring 82. The spring 82 pulls the head portion 56 of the pilot pin 50 in the backwards direction B and against the washer 100 so that the pilot pin 50 is disengaged from the opening 62 formed in the poppet 60. Water is drained from the outer housing 36 and the poppet is then moved into the open position.

As shown in FIGS. 2-2B, when the normally-open poppet valve 30 is in the open position, the spring 82 is at rest. To close the normally-open poppet valve 30, the armature 40 is energized and moved in the forward direction F towards the stationary guide member 90. The armature 40 drives the rod 46 and pilot pin 50 in the forward direction F. Compression of the spring 82 increases between the e-clip 106 and the washer 100, as the cage 70 is stationary with respect to the poppet 60 and the armature 40 rod 46 bias the pilot pin 50 into engagement with the opening 62 formed in the poppet 60.

As shown in FIG. 2, when the normally-open poppet valve 30 is in the closed position, the transverse opening 72 of the cage 70 is blocked by the poppet 60 and the opening 62 formed in the poppet 60 is blocked by the pilot pin 50. The closed position of the normally-open poppet valve 30 prevents water from escaping the outer housing 36, but allows water to enter through an opening 64 formed in a side of the poppet 60, as shown in FIGS. 1, 2, 4, and 4B. This causes an increase in pressure inside the valve housing 36 that equals the water pressure outside the valve housing 36, which causes the poppet 60 to be biased in the forward direction F with the aid of, for example, the armature 40 and an energized solenoid coil acting on the rod 46, pilot pin 50, and poppet 60. The normally-open poppet valve includes the pilot pin 50 moved out of engagement with the opening 62, the pressure within the valve housing 36 is released, and the poppet is moved from the closed position to the open position by the external water pressure. When the normally-open poppet valve 30 is configured to be in an open position during operation, as shown in FIG. 1, the spring 82 is substantially uncompressed in the open position and approximately at rest. In the closed position, the armature 40 is positioned in a forward direction F and the pilot pin 50 and poppet 60 are moved towards the poppet and block the transverse opening 72 of the cage 70. In the closed position, compression of the spring 82 increases between the e-clip 106 and the washer 100, as the cage 70 is stationary with respect to the poppet 60. After the poppet 60 has been maintained in the closed position for a predetermined period of time, the armature 40 is de-energized and the spring 82 applies a return force to the pilot pin 50 in a backward direction B, which in turn drives the poppet 60 back towards the open position shown in FIG. 1 with the aid of water pressure.

Each component of the normally-open poppet valve 30 is specifically designed and configured to be suited for regulating jets of high pressure water, and generally operate at pressures of 2000-4000 psi. To that end, the present normally-open poppet valve 30 is formed with specific features, tolerances, and treatments to improve performance in water-based applications and address the problems experienced by oil type poppet valves. As shown in FIGS. 4, 4B, and 8 the poppet 60 has a plurality of annular grooves 66 formed on an outer surface thereof. Three annular grooves 66 may be formed on the poppet 60, each having a width of approximately 0.025 inches, for example. The three annular grooves 66 are specially oriented on the poppet 60 and collect small particles that would normally become caught between the poppet 60 and the cage 70 and also collect water. The water acts as a lubricant which improves the performance and life span of the poppet 60 by reducing wear. This results in improved alignment and performance of the normally-open poppet valve 30. The annular groove 67 furthest from the tapered end of the poppet 60 has an increased width and e area compared to the other annular grooves 64. The increased surface area assists in increasing the life span of the poppet 60. An inner edge 68 of the opening 62 formed in the poppet 60 is precision machined to be free of nicks and burrs, with a maximum radius of curvature of 0.002 inches. This ensures a precise fit between the end of the head portion 56 of the pilot pin 50 and the opening 62 of the poppet 60. The total length of the poppet 60 travel in the cage 70 affects the flow rate of the water through the normally-open poppet valve 30 and can be selected based on the specific application.

To prevent leakage problems, the components of the present poppet valve are formed with very tight tolerances. The very tight tolerances are achieved through a special manufacturing process. The components are first machined to achieve a near finished dimension and are then heat treated to increase the metal's hardness. The extreme application of heat can slightly change the dimensions of the components. Because of this, after the hardening process, precision grinding is required to bring the components to the finished dimensions. Once the finished dimensions have been achieved, the pilot pin 50, poppet 60, and cage 70 are coated with a titanium nitride (TiN) finish or nitrided through a nitrocarburizing process, which protects against corrosion, and increases wear resistance finish for increased wear resistance. For example and without limitation, the outer diameter of the poppet 60 is preferably machined with a tolerance of approximately +0.0000 inches and −0.0002 inches. The cage 70 is also precision machined with an inner diameter tolerance of ±0.0002 inches so that when the poppet 60 and the cage 70 are assembled, the total tolerance between the outer surface of the poppet 60 and the inner surface of the cage 70 is approximately +0.0001 inches and −0.0009 inches. The cage 70 may have a length and outer diameter tolerance of ±0.002 inches. The pilot pin 50 is machined to have a length tolerance of approximately +0.003 inches and −0.000 inches, and an outer diameter tolerance of approximately +0.000 inches and −0.002 inches. These precise tolerances allow the present normally-open poppet valve 30 to be used in high pressure water applications with rapid opening and closing times and high cycles without leakage.

To further protect the present normally-open poppet valve 30 from leakage, wear, and corrosion, the components are formed from specially treated materials. The normally-open poppet valve 30 is configured to cycle between the open position and the closed position at a rate of approximately 1-5 times per second, with a total life cycle of at least 1 million cycles. The armature 40, pilot pin 50, and poppet 60 can be configured to maintain the open position for a period of at least 0.02 seconds. For example and without limitation, the pilot pin 50, poppet 60, and cage 70 can each be formed from stainless steel (such as grade 440), heat treated to a hardness of approximately 40-60 Rc, and then treated with titanium nitride or nitrided through a nitrocarburizing process, which protects against corrosion, and increases wear resistance. The pilot pin 50 may be heat treated to a hardness of approximately 50-55 Rc. The poppet 60 may be heat treated to a hardness of approximately 52-60 Rc. The cage 70 may be heat treated to a hardness of approximately 42-50 Rc. After these components have been heat treated and then surface treated with titanium nitride or nitrided through a nitrocarburizing process, these components can be polished to obtain the tolerances specified above. Both finishes add hardness to the sliding surfaces of these components and protects against corrosion from water. This increases the wear resistance of these components. One of ordinary skill in the art would appreciate that other materials with suitable hardness and wear resistance can be used to form the components of the normally-open poppet valve 30 and that other surface treatments can be applied.

The spring 82 can also be made from stainless steel and specifically configured to withstand long term fatigue from the high pressure water flow and the frequency of operating cycles. The spring 82 is machined according to the geometry the poppet valve 30, 110 determines. In one embodiment, the spring 82 can have an outer diameter of approximately 0.240 inches and an inner diameter of approximately 0.170 inches, the total tolerance between the outer diameter and the inner diameter is approximately +0.003 inches and −0.005 inches. In another embodiment, the spring 82 can have an outer diameter of approximately inches and an inner diameter of approximately 0.072 inches, the total tolerance between the outer diameter and the inner diameter is approximately +0.002 inches and −0.005 inches. The guide member 90 can be formed from low carbon steel and machined to proper tolerances to receive the pilot pin 50 and the spring 82. The armature 40 can also be formed from low carbon steel. After the guide member 90 and armature 40 are machined to the proper tolerances, both are nitrided through a nitrocarburizing process, which protects against corrosion, and increases wear resistance.

As discussed above, the present poppet valve 30, 110 can be configured to be in an open position or in a closed position during operation. In one embodiment shown in FIGS. 8 and 8A, the normally-closed poppet valve 110 is configured to be in a closed position. The normally-closed poppet valve 110 includes an outer housing 36, a movable armature 40 arranged within the housing 36, and a transmission element 44 driven by the armature 40 and associated with a poppet 60. A cage 70 is arranged around the poppet 60, the cage 70 having at least one transverse opening 72 adapted for water to flow therethrough. The transmission element 44 can include, for example and without limitation, a pilot pin 50 having a first end 52 associated with and driven by the armature 40, and a second end 54 arranged within the poppet 60. The e-clip 106, as discussed above, is positioned at a middle portion of the pilot pin 50 and captured within a t-slot 108 formed in the armature 40. When the armature 40 is moved in the forward direction F towards the closed position, the shoulder 107 of the armature 40 pushes on an end of the pilot pin 50. The components of this normally-closed poppet valve 110 can be formed from the same materials and treatments and machined to the same specific tolerances discussed above with respect to the normally-open poppet valve 30 to ensure high performance characteristics in water-based applications.

In the normally-closed poppet valve 110, the return element 80 is arranged between the armature 40 and an end axial surface of the housing 36. In other words, the return element 80 is positioned behind the armature 40, at an end opposite from the end of the armature 40 that is connected to the pilot pin he return element 80, which can be a compression spring 82, biases the armature 40 in the forward direction F towards the closed position. Accordingly, when the armature 40 is not activated, the poppet 60 is maintained in the closed position to block the transverse opening 72 in the cage 70, and the spring 82 is uncompressed. To move the poppet 60 to the open position, the armature 40 is actuated to move in the backward direction B, which in turn pulls the poppet 60 backwards to unblock the transverse opening 72 in the cage 70 and allow water to flow through. When the normally-closed poppet valve 110 is in the open position, the spring 82 is compressed between the armature 40 and the end axial surface of the housing 36. After the poppet 60 has been maintained in the open position for a predetermined period of time, the armature 40 is deactivated and the spring 82 applies a return force to the armature 40 in the forward direction F, which drives the pilot pin 50 and poppet 60 towards the closed position where the transverse opening 72 of the cage 70 is blocked by the poppet 60.

A method of adjusting a flow rate of the normally-open poppet valve 30 is also disclosed. As discussed above with respect to the normally-open poppet valve 30 shown in FIGS. 1, 6, 6B, 7, and 7A, a washer 100 can be arranged between the guide member 90 and the poppet 60. Specifically, the washer 100 can include a radially inner portion 102 that abuts against a front end 84 of the spring 82, providing a surface for the spring 82 to be compressed against as the armature 40 moves in the forward direction F to move the poppet 60 to the closed position. The washer 100 can further include a radially outer portion 104 that is sandwiched between the axial end 74 of the cage 70 and the front end surface 96 of the guide member 90. The total thickness of the washer 100 thus changes the distance between the sealing edge of the cage 70 and the furthest rearward movement of the poppet 60 and, in turn, the time and distance it takes to move the poppet 60 between the open and closed positions and the flow rate of the normally-open poppet valve 30.

In one embodiment, the washer 100 is a reversible washer 105 and provides an abutment surface for the spring 82 and separates the cage 70 from the guide member 90. To easily change the flow rate of the poppet valve 30 t having to replace the entire valve, a normally-open poppet valve 30 is provided having the outer housing 36, a movable armature 40 arranged within the housing, a pilot pin 50 and a poppet 60 driven by the armature 40, a return element 80 associated with the pilot pin 50, and a cage 70 arranged around the poppet 60, the cage 70 having a transverse opening 72 adapted for water to flow there through. The reversible washer 105 may be formed with two different axial thicknesses positioned on opposing sides of the washer 105. A radially outer portion 104 of the reversible washer 105 can be sandwiched between the axial end 74 of the cage and the front end surface 96 of a guide member 90 arranged around the pilot pin. A first axial thickness Ti of the reversible washer 105 is selected to correspond to a first flow rate of the normally-open poppet valve 30. The washer 105 is reversed on the pilot pin 50 to provide a second flow rate. For example, and without limitation, the washer 105 may be reversed by removing the cage 70 and poppet 60 from the valve housing 36. Once the cage 70 and poppet 60 are removed, the e-clip 106 and spring 82 may be removed from the pilot pin 50. Once the e-clip 106 and spring 82 are removed, the washer 105 may be reversed so that a second axial thickness T2 and surface, different from the first axial thickness T1, is towards the poppet 60. Once the washer 105 has been reversed, the spring 82, e-clip, poppet 60, and cage 70 are replaced. In this manner, the flow rate of the normally-open poppet valve 30 and be quickly and easily adjusted by reversing the washer 105.

Examples of the reversible washer 105 are shown in FIG. 6B, in which the first axial thickness T1 of the reversible washer 105 is greater than the second axial thickness T2 of the reversible washer. To increase the flow rate of a normally-open poppet valve 30, the second axial thickness T2 of the reversible washer 105 is adjusted to face the poppet 60. The lesser second axial thickness T2 of the reversible washer 105 increases the distance the poppet 60 travels backwards toward the axial end 74 of the cage 70 where the poppet moves into the open position. This increased distance results in a greater opening and increases the flow rate of the normally-open poppet valve 30. Likewise, the first axial thickness T1, which is greater than the second axial thickness T2, decreases the distance and the time required to move the poppet 60 between the open and closed positions and decreases the flow rate of the normally-open poppet valve 30.

The present method of adjusting the flow rate of the normally-open poppet valve 30 through a reversible washer 105 with different thicknesses is advantageous in that the same normally-open poppet valve 30 can be used in applications with different flow rate requirements at a low cost, as only the washer component needs to be reversed instead of replacing the entire normally-open poppet valve 30. The structure of the present normally-open poppet valve 30 also allows a user to quickly and easily adjust the flow rate without the need for complicated tools or steps, as the reversible washer 105 can be readily accessed by disconnecting the cage 70 from the housing 36 and removing the poppet 60 and pilot pin 50.

Having thus described various methods, configurations, and features of the present poppet valve in detail, it is to be appreciated and will be apparent to those skilled in the art that many physical changes, only a few of which are exemplified in the detailed description above, could be made in the apparatus and method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A poppet valve for controlling flow, the poppet valve comprising:
   a housing;
   a movable armature arranged within the housing;
   a pilot pin having first and second ends, the first end being associated with and driven by the armature;
   a poppet arranged around the second end of the pilot pin;
   a return element associated with the pilot pin; and
   a cage arranged around the poppet, the cage having a transverse opening adapted for water to flow therethrough,
   wherein the armature is selectively actuated to drive the pilot pin in a first direction towards a closed position, in which the transverse opening of the cage is blocked by the poppet, and the return element drives the pilot pin in a second direction towards an open position, in which the transverse opening of the cage is unblocked by the poppet,
   characterized in that the poppet valve comprises a reversible washer arranged between a guide element and an axial end of the cage, wherein the reversible washer is formed with two different axial thicknesses positioned on opposing sides of the washer, the first axial thickness on the first side being selected to correspond to a first flow rate, the second axial thickness on the second side being selected to correspond to a second flow rate, wherein the reversible washer can be reversed between the guide element and the axial end of the cage so that the distance the poppet travels backwards towards the axial end of the cage where the poppet moves into the open position is modified.

2. The poppet valve of claim 1, further comprising a rod connected between the armature and the first end of the pilot pin, and a guide member arranged around the rod and the first end of the pilot pin.

3. The poppet valve of claim 1, wherein the return element is a spring arranged around the pilot pin.

4. The poppet valve of claim 3, further comprising the washer arranged at an axial end of the cage, wherein an end of the spring abuts against the washer.

5. The poppet valve of claim 1, wherein at least three annular grooves are formed on an outer surface of the poppet valve and at least one of the at least three annular grooves has a greater surface area than the other of the at least three annular grooves.

6. The poppet valve of claim 1, wherein the poppet is substantially cylindrical shaped, and has an outer diameter tolerance of approximately +0.0000 inches and −0.0002 inches.

7. The poppet valve of claim 6, wherein an outer surface of the poppet and an inner surface of the cage has a total tolerance of approximately +0.0001 inches and −0.0009 inches.

8. The poppet valve of claim 1, wherein the pilot pin has a length tolerance of approximately +0.003 inches and −0.000 inches and an outer diameter tolerance of approximately +0.000 inches and −0.002 inches.

9. The poppet valve of claim 1, wherein the armature is driven by a solenoid arranged around the housing.

10. The poppet valve of claim 1, wherein the armature, pilot pin, and poppet are configured to cycle between the open position and the closed position at a rate of approximately 1-5 times per second, with a total life cycle of at least 1 million cycles.

11. The poppet valve of claim 1, wherein the armature, pilot pin, and poppet are configured to maintain the open position for a period of at least 0.02 seconds.

12. The poppet valve of claim 1, wherein the pilot pin, poppet, and cage are each formed from stainless steel, heat treated to a hardness of approximately 40-60 Rc, and then treated with titanium nitride or nitrided through a nitrocarburizing process.

13. The poppet valve of claim 12, wherein the pilot pin is heat treated to a hardness of approximately 50-55 Rc, the poppet is heat treated to a hardness of approximately 52-60 Rc, and the cage is heat treated to a hardness of approximately 42-50 Rc.

14. The poppet valve of claim 1, wherein the poppet is maintained in the open position by a return element that pulls a head portion of the pilot pin towards the armature.

15. The poppet valve of claim 1, wherein the poppet is maintained in the closed position by the return element, and actuation of the armature drives a transmission element and poppet towards the open position.

16. The poppet valve of claim 1, wherein transmission element comprises a rod and a pilot pin, the rod being connected between the armature and the pilot pin.

17. The poppet valve of claim 1, wherein the armature drives a transmission element and the poppet between the open position and the closed position at a rate of approximately 1-5 times per second, and the poppet is maintained in the open position for a period of at least 0.02 seconds.

18. The poppet valve of claim 1, wherein a transmission element driven by the armature, the poppet associated with the transmission element, and the cage each includes a surface treatment configured to withstand corrosion from water.

19. A method of adjusting a flow rate of a poppet valve for controlling water flow, the method comprising:
providing a poppet valve having a housing, a movable armature arranged within the housing, a pilot pin and a poppet driven by the armature, a return element associated with the pilot pin, a cage arranged around the poppet, the cage having a transverse opening adapted for water to flow therethrough, and a reversible washer having a first side and a first axial thickness arranged between a guide element and an axial end of the cage, the first axial thickness being selected to correspond to a first flow rate;
reversing the washer in the poppet valve;
providing a second axial thickness different from the first axial thickness, the second axial thickness being selected to correspond to a second flow rate; and
installing a second side of the reversible washer in the poppet valve by reversing the reversible washer between the return element and the axial end of the cage.

* * * * *